(12) United States Patent
Lev et al.

(10) Patent No.: US 8,432,675 B2
(45) Date of Patent: Apr. 30, 2013

(54) INTEGRATED LIGHTING FOR USE WITH COMPUTER CAMERAS

(75) Inventors: Jeffrey A. Lev, Tomball, TX (US); Paul J. Doczy, Cypress, TX (US); Mark S. Tracy, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 206 days.

(21) Appl. No.: 13/003,600

(22) PCT Filed: Jul. 18, 2008

(86) PCT No.: PCT/US2008/070438
§ 371 (c)(1),
(2), (4) Date: Jan. 11, 2011

(87) PCT Pub. No.: WO2010/008394
PCT Pub. Date: Jan. 21, 2010

(65) Prior Publication Data
US 2011/0116223 A1    May 19, 2011

(51) Int. Cl.
*G06F 1/16* (2006.01)
(52) U.S. Cl.
USPC ............... 361/679.23; 361/679.26; 362/11; 362/253; 362/355; 362/602
(58) Field of Classification Search ............... 361/679.23
See application file for complete search history.

(56) References Cited

U.S. PATENT DOCUMENTS

| | | | | |
|---|---|---|---|---|
| 6,353,529 | B1 * | 3/2002 | Cies | 361/679.05 |
| 6,487,069 | B1 * | 11/2002 | Onodera | 361/679.09 |
| 6,587,151 | B1 * | 7/2003 | Cipolla et al. | 348/373 |
| 6,776,497 | B1 * | 8/2004 | Huppi et al. | 362/85 |
| 6,784,916 | B2 * | 8/2004 | Smith | 348/14.01 |
| 7,452,098 | B2 * | 11/2008 | Kerr | 362/154 |
| 7,631,979 | B1 * | 12/2009 | Brown et al. | 362/3 |
| 7,641,362 | B2 * | 1/2010 | Ryder et al. | 362/253 |
| 7,903,171 | B2 * | 3/2011 | Takabatake et al. | 348/376 |
| 2001/0043188 | A1 * | 11/2001 | Nakamura | 345/102 |
| 2002/0085371 | A1 | 7/2002 | Katayama et al. | |
| 2006/0221206 | A1 * | 10/2006 | Lin et al. | 348/227.1 |
| 2006/0268505 | A1 * | 11/2006 | Krah | 361/683 |
| 2007/0103918 | A1 * | 5/2007 | Lin | 362/427 |
| 2007/0165406 | A1 * | 7/2007 | Wang | 362/253 |
| 2007/0242421 | A1 * | 10/2007 | Goschin et al. | 361/681 |
| 2008/0013262 | A1 * | 1/2008 | Stanford et al. | 361/680 |
| 2008/0297591 | A1 * | 12/2008 | Aarts et al. | 348/51 |

FOREIGN PATENT DOCUMENTS

| | | | |
|---|---|---|---|
| GB | 2440976 A | * | 2/2008 |
| JP | 2001325043 | | 11/2001 |
| KR | 10-2005-0056470 | | 6/2005 |

OTHER PUBLICATIONS

The International Search Report and the Written Opinion of the International Searching Authority for International Application No. PC/US2008/070438 dated Apr. 6, 2009, pp. 12.

* cited by examiner

*Primary Examiner* — Anthony Q Edwards

(57) ABSTRACT

In one embodiment, a computer display includes a display screen, an outer housing that surrounds the display screen, and a light integrated into the outer housing.

19 Claims, 4 Drawing Sheets

INTEGRATED LIGHTING FOR USE WITH COMPUTER CAMERAS

BACKGROUND

It is now common for computer users to capture images and/or video of themselves with a camera associated with their computer. Such cameras, typically referred to as "web" cameras, are now often integrated into notebook computers to provide the same functionality.

As notebook computers become smaller, there is increased need to use smaller image sensors for the web cameras. The reduction in size of the sensors results in a concomitant reduction in size of the sensor's pixels. Unfortunately, the smaller the pixels, the less light they can collect. As a consequence, many web cameras do not perform well in moderate to low light conditions, particularly when the subject (e.g., the computer user) is moving while an image is being captured.

Although lights independent of the computer can be used to shine light on the subject, it may be difficult to properly illuminate the subject and avoid undesired shadows. Although there are independent lights that are capable of properly illuminating the subject, such lights must be carried along with the notebook computer if they are to be used wherever the computer is used to capture images and/or video.

BRIEF DESCRIPTION OF THE DRAWINGS

The disclosed integrated lighting can be better understood with reference to the following drawings. The components in the drawings are not necessarily to scale.

DETAILED DESCRIPTION

As described above, computer cameras may perform poorly in moderate to low light conditions. Described in the following is integrated lighting that can be used to illuminate a subject that is to be captured by such a camera. In some embodiments, the lighting is integrated into a computer display. Such a display can, for example, comprise a display of a notebook computer.

Figure 1:
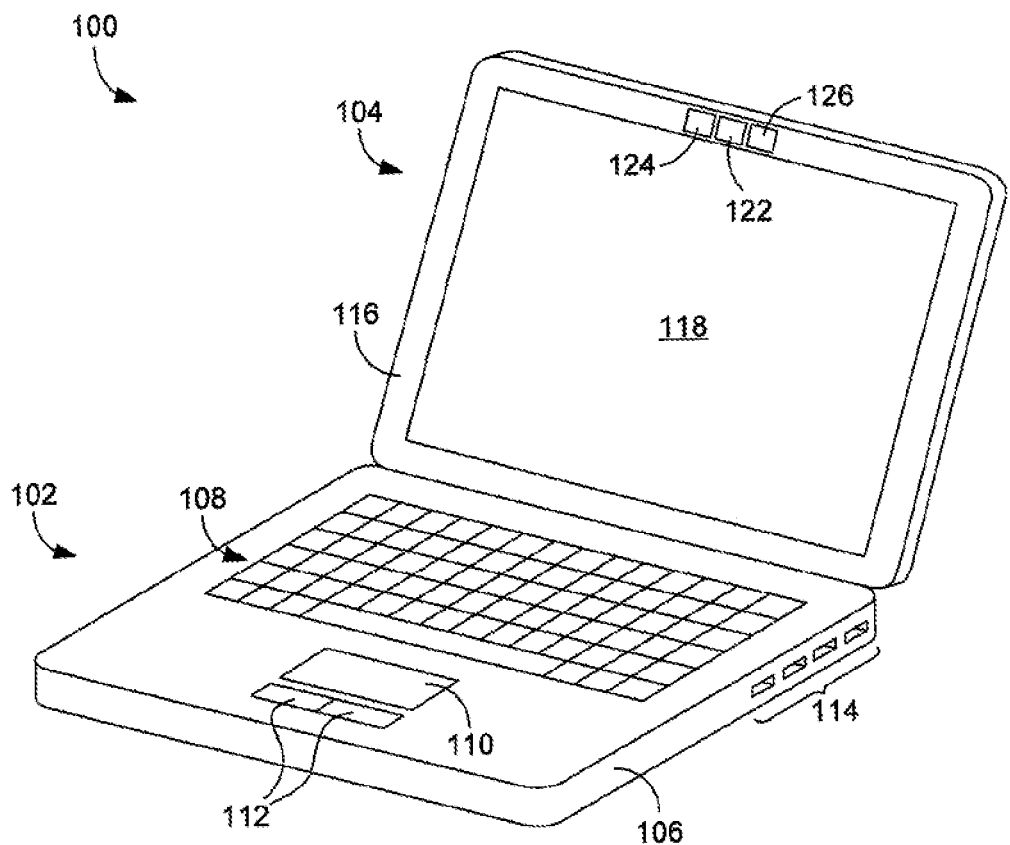
FIG. 1 is a perspective view of an embodiment of a computing device having integrated lighting.

Referring now in more detail to the drawings, in which like numerals indicate corresponding parts throughout the views, FIG. 1 illustrates a computing device 100 in the form of a notebook or "laptop" computer. As indicated in FIG. 1, the computing device 100 includes a base 102 and a display 104 that is pivotally connected to the base. The base 102 includes an outer housing 106 that surrounds various internal components of the computing device 100, such as a processor, memory, hard drive, and the like. Also included in the base 102 are user input devices, including a keyboard 108, a touchpad 110, and selection buttons 112.

The display 104 includes its own outer housing 116 that supports and surrounds a display screen 118, such as a liquid crystal display (LCD) screen. Integrated into the outer housing 116 is a "web" camera 122, a light sensor 124, and a light 126. As indicated in FIG. 1, the camera 122, sensor 124, and light 126 can be positioned adjacent each other along a top side or edge of the outer housing 116. As described below, each of those components can be used when capturing still images and/or video data of a subject, such as the computer user. Although the light 126 is depicted as being located at the top of the display 104, it is noted that the light can be located at another position. Indeed, in some embodiments, the light 128 can be integrated into the outer housing 106 of the base 102.

Figure 2:
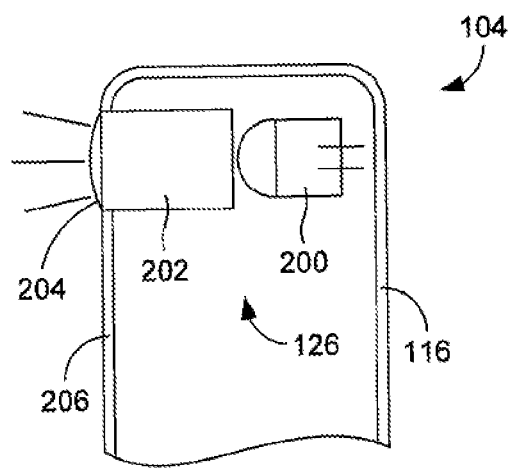
FIG. 2 is a partial side view of a display of the computing device of FIG. 1, illustrating an embodiment of a light integrated into the display.

FIG. 2 illustrates an example embodiment for the integrated light 126. As shown in FIG. 2, the light 126 includes a light source 200 that is contained within the outer housing 116 of the display 104. In some embodiments, the light source 200 comprises a light emitting diode (LED), such as a white LED. As is further shown in FIG. 2, the integrated light 126 can further include a diffusion element 202 that diffuses the light emitted by the light source 200 to avoid bright spots that may distract or irritate the computer user. In some embodiments, the diffusion element 202 comprises a light pipe that contains a material, such as talc, that diffuses rays of light that pass through the pipe. The diffusion element 202 can, at least partially, be contained within the outer housing 116, and an outer surface 204 of the element can be exposed through a front bezel 206 formed by the housing.

Figure 3:
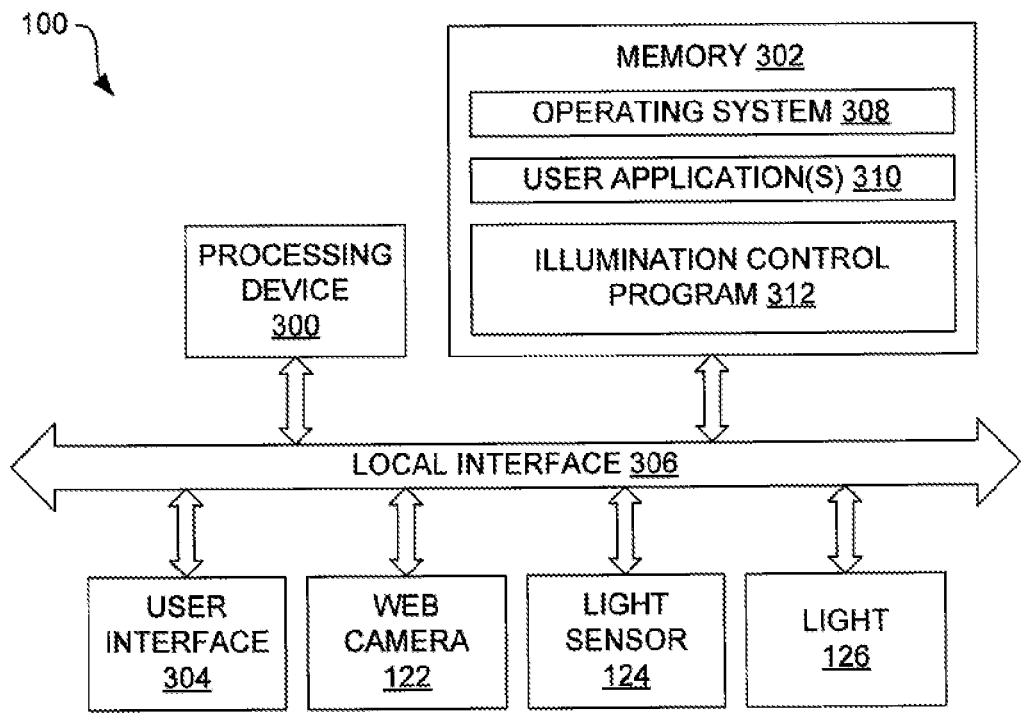
FIG. 3 is a block diagram illustrating an embodiment of architecture for the computing device of FIG. 1.

FIG. 3 is a block diagram illustrating an example architecture for the computing device 100. As indicated in FIG. 3 the computing device 100 comprises a processing device 300, memory 302, a user interface 304, the web camera 122, the light sensor 124, and the light 126, each of which is connected to a local interface 306.

The processing device 300 can comprise a central processing unit (CPU) that controls overall operation of the computing device 100 and the memory 302 includes any one of or a combination of volatile memory elements (e.g., RAM) and nonvolatile memory elements (e.g., hard disk, ROM, tape, etc.) that store code that can be executed by the processing device 300.

The user interface 304 comprises the components with which a user interacts with the computer 100, such as the keyboard 108, touchpad 110, and buttons 112 identified above in relation to FIG. 1. The web camera 122 comprises an image sensor that converts an optical image to an electric signal. By way of example, the image sensor comprises a charged-coupled device (CCD) or a complementary metal-oxide-semiconductor (CMOS) sensor. The light sensor 124 comprises a photodetector, such as a photodiode, that converts light intensity into an electric signal. An embodiment for the integrated light 126 has been described above in relation to FIG. 2. The light 126 may further include a control element that receives instructions from the processing device 300 that indicated how to control the light.

The memory 302 comprises various programs (i.e., logic), including an operating system 308, one or more user applications 310, and an illumination control program 312. The operating system 308 controls the execution of other programs and provides scheduling, input-output control, file and data management, memory management, and communication control and related services. The user applications 310 can comprise any application that executes on the computing device 100, which may include an image capture program, a video conferencing program, and the like. As described in greater detail below, the illumination control program 312 is configured to control operation of the light 126 during operation of the web camera 122. In some embodiments, the light 126 is controlled relative to ambient light conditions sensed by the light sensor 124.

Figure 4:
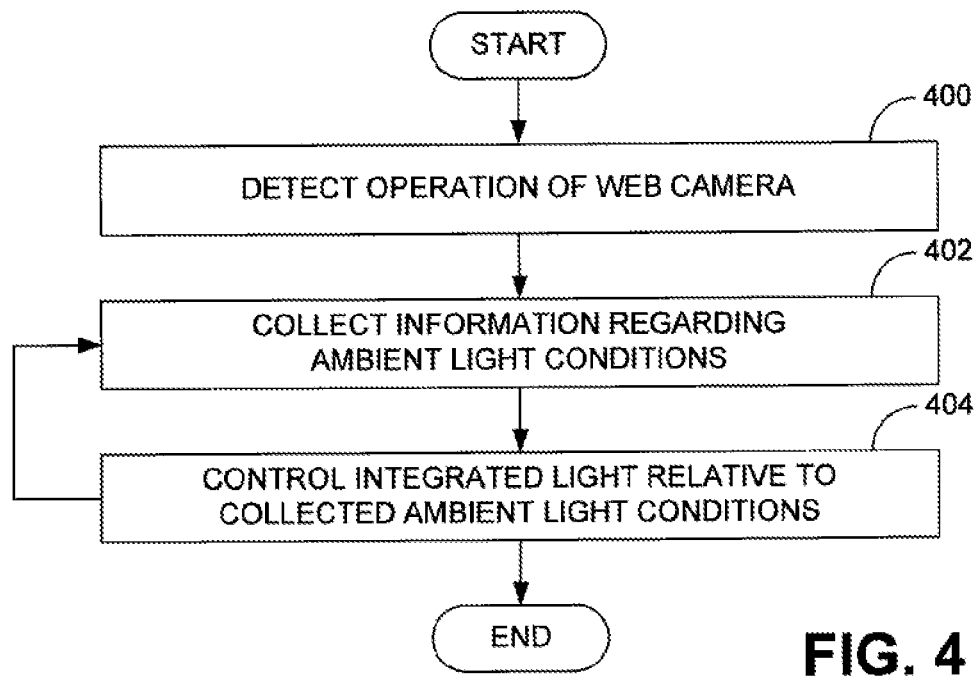
FIG. 4 is a flow diagram of an embodiment of a method for controlling illumination of a subject.

Referring next to FIG. 4, illustrated is an embodiment of a method for controlling illumination of a subject during image and/or video capture that can be performed, at least in part, relative to instructions contained in the illumination control program 312. Beginning with block 400, operation of the web camera 122 is detected. Operation may include actual operation of the camera 122 in capturing one or more images, or preparation for capturing one or more images. Upon such detection, information regarding ambient light conditions are collected, as indicated in block 402. By way of example, that information can be collected from the light sensor 124. Next, the integrated light 126 is controlled relative to the information regarding the ambient light conditions, as indicated in block 404.

The "control" that is exercised depends upon the ambient light conditions as well as characteristics of the web camera 122. For example, if the ambient light conditions are good, meaning that there is adequate light to capture high quality still images and/or video with the web camera 122 without providing supplemental light, the integrated light 126 may not be activated. If, on the other hand, the ambient light conditions are not good, meaning that there is not enough light to capture high quality images and/or video with the web camera 122 without providing supplemental light, the integrated light 126 is activated. Notably, the extent of activation, i.e., the amount of power provided to the light 126, may be controlled relative to the observed ambient light conditions. For instance, in moderate light conditions, the integrated light 126 may be powered to a relatively low level such that is shines with less than its maximum intensity. However, in low light conditions, the integrated light 126 may be operated to shine more light on the subject. With such operation, the brightness of the integrated light 126 can controlled relative to the available ambient light.

With further reference to FIG. 4, flow can repeatedly return to block 402 such that current ambient light conditions are determined to enable adjustment of the integrated light 126 (including turning the light off or on) as may be required by those conditions. Accordingly, as the ambient light conditions change, the amount of supplemental light shined upon the subject can likewise be changed to enable adaptive lighting.

Figure 5:
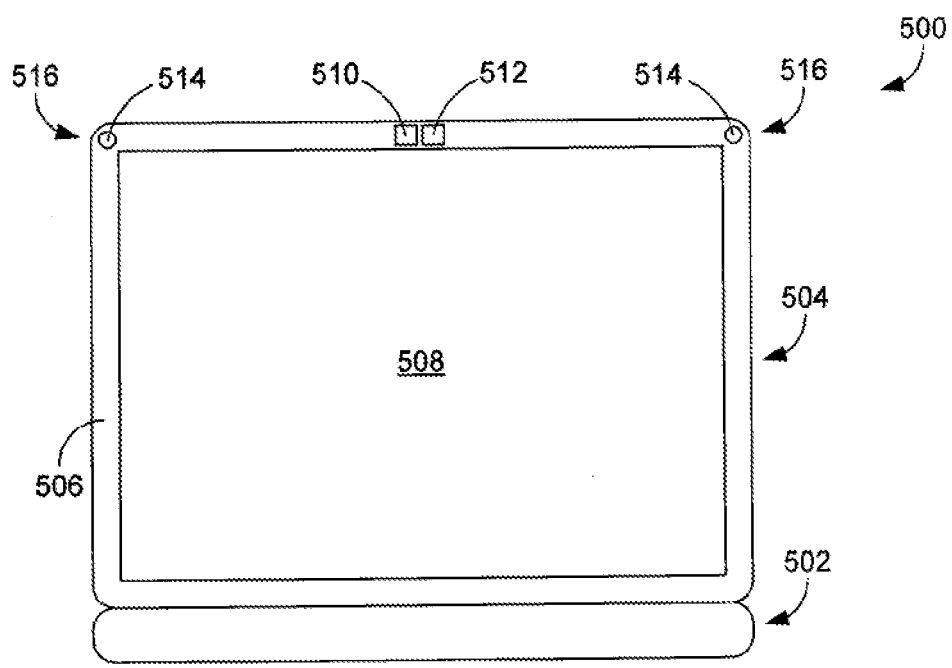
FIG. 5 is a front view of a first alternative computing device having integrated lighting.
Figure 6:
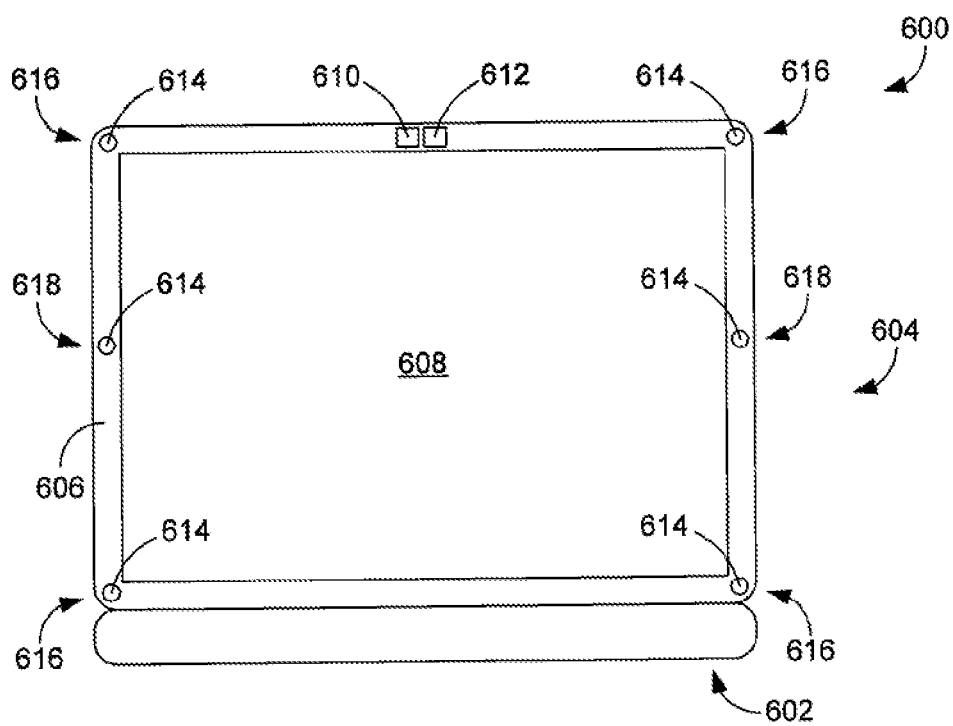
FIG. 6 is a front view of a second alternative computing device having integrated lighting.

Referring next to FIGS. 5 and 6, illustrated are alternative embodiments of a computing device having integrated illumination. Beginning with FIG. 5, a notebook computer 500 is shown that includes a base 502 and a pivotally connected display 504. The display 504 comprises an outer housing or bezel 506 and a display screen 508. Integrated into the outer housing or bezel 506 are a web camera 510 and a light sensor 512. Also integrated into the outer housing or bezel 506 are multiple lights 514, which can have configurations and can be controlled as described above with reference to the light 126. Unlike the light 126, however, the lights 514 are spaced apart from the web camera 510. Specifically, a light 514 is positioned in each of the two upper corners 516 of the outer housing or bezel 506. Through use of multiple, spaced lights 516, a greater amount of illumination can be provided and shadows can be reduced or eliminated.

Turning next to FIG. 6, a further notebook computer 600 is shown that includes a base 602 and a pivotally connected display 604. The display 604 also comprises an outer housing 606 and a display screen 608. Integrated into the outer housing or bezel 606 are a web camera 610 and a light sensor 612. Also integrated into the outer housing or bezel 606 are multiple lights 614, which can have configurations and can be controlled as described above with reference to the light 126. Unlike the light 126, however, the lights 614 are spaced apart from the web camera 610. In the embodiment of FIG. 6, a light 614 is positioned in each of the four corners 616 of the outer housing or bezel 606, and further lights 614 are positioned approximately midway along lateral sizes 618 of the outer housing or bezel.

Figure 7:
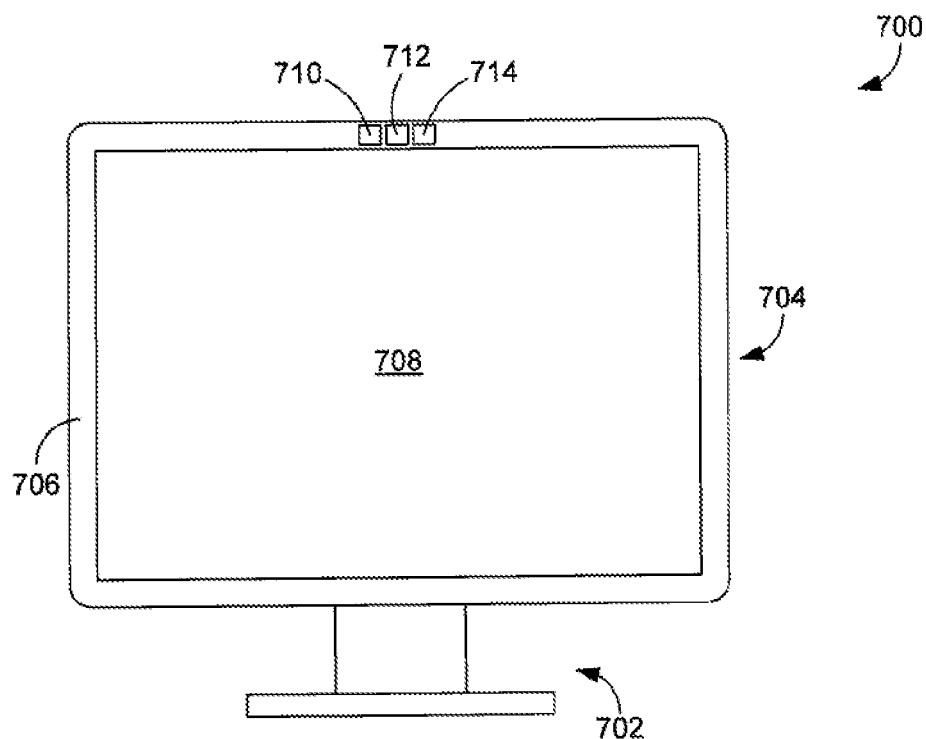
FIG. 7 is a front view of a first independent computer display having an integrated camera and integrated lighting.
Figure 8:
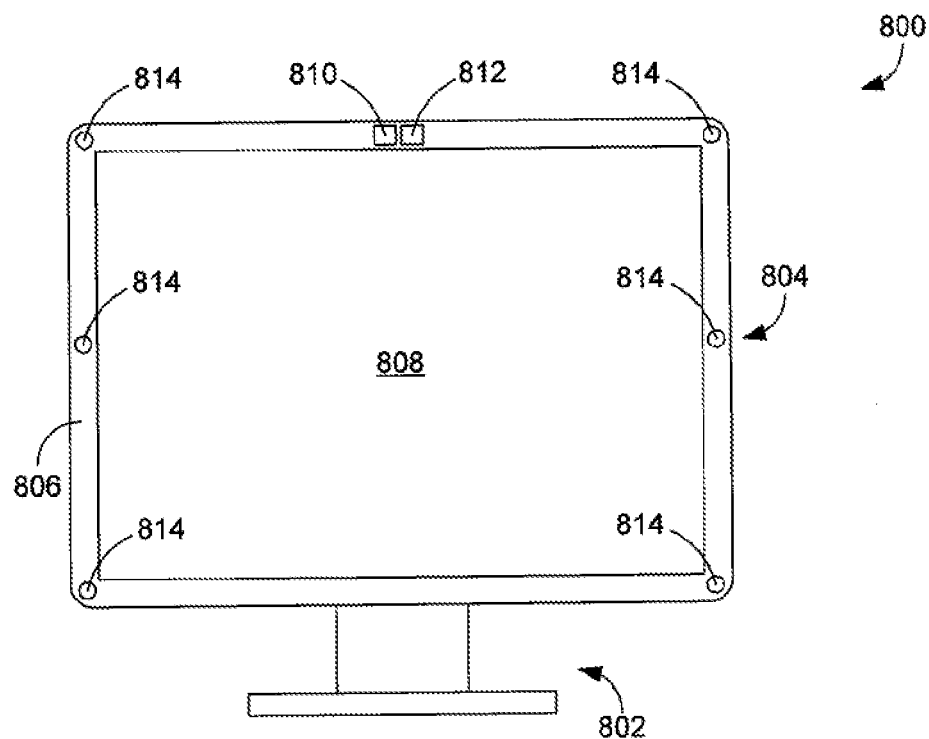
FIG. 8 is a front view of a second independent computer display having an integrated camera and integrated lighting.

Referring to FIGS. 7 and 8, illustrated are independent computer displays having integrated illumination. Such displays can, for example, be used in conjunction with a desktop computer (not shown) having logic similar to that described above in relation to FIG. 3. Beginning with FIG. 7, a computer display 700 is shown that includes a stand 702 and a display portion 704 that is supported by the stand. The display portion 704 comprises an outer housing or bezel 706 and a display screen 708. Integrated into the outer housing or bezel 706 are a web camera 710, a light sensor 712, and a light 714, which are each positioned adjacent each other along the top side or edge of the outer housing or bezel. The light 714 can have a configuration and can be controlled as described above with reference to the light 126.

Turning next to FIG. 8, a further computer display 800 is shown that includes a stand 802 and a display portion 804 that is supported by the stand. The display portion 804 comprises an outer housing or bezel 806 and a display screen 808. Integrated into the outer housing or bezel 806 are a web camera 810 and a light sensor 812 that are positioned adjacent each other along the top side or edge of the outer housing or bezel. In addition, multiple spaced lights 814 are integrated into the outer housing or bezel 806 at various positions about the periphery of the display screen 808.

As can be appreciated from the foregoing, automatic adaptive illumination can be provided relative to sensed ambient light conditions. With such operation, the user need not take any special steps to capture high quality images and/or video with the user's computer. It is noted, however, that, in some embodiments, the light(s) can be manually controlled. For example, the display or computer that comprises the light(s) can include a switch that can be used to turn the light on or off as well as control the intensity of the light when on. In other embodiments, the light(s) can be controlled by pressing one or more keys on a computer used in conjunction with the display that incorporate the light(s). In still other embodiments, the light(s) can be controlled using an associated program that runs on the computer that includes a graphical user interface with which the user can control the light(s).

The invention claimed is:

1. A computer display comprising:
    a display screen;
    an outer housing that surrounds the display screen;
    a light integrated into the outer housing, and a processing device and memory, the memory storing an illumination control program configured to control operation of the integrated light by presenting a graphical user interface on the display facilitating manual control of the integrated light.

2. The display of claim 1, wherein the display screen comprises a liquid crystal display screen.

3. The display of claim 1, wherein the outer housing includes a front bezel into which the light is integrated.

4. The display of claim 1, wherein the light comprises:
    a light emitting diode; and a diffusion element between the light emitting diode and a front of the display screen.

5. The display of claim 1, wherein the display includes multiple lights integrated into the outer housing.

6. The display of claim 5, wherein the lights are spaced from each other.

7. The display of claim 1, further comprising a camera that is integrated into the outer housing.

8. The display of claim 1, further comprising a light sensor that is integrated into the outer housing.

9. The display of claim 1, wherein the display comprises part of a notebook computer.

10. A computer display comprising:
a display screen;
an outer housing that surrounds the display screen;
a web camera integrated into the outer housing; a light sensor integrated into the outer housing;
a light integrated into the outer housing, the light being configured to illuminate a subject that is captured by the web camera, where the light comprises:
a light source; and
a diffusion element between the light source and a front of the display screen through which light from the light source passes and is diffused and a processing device and memory, the memory storing an illumination control program configured to control operation of the integrated light by presenting a graphical user interface on the display facilitating manual control of the integrated light.

11. The display of claim 10, wherein the web camera, light sensor, and light are positioned along a top side of the outer housing.

12. The display of claim 10, wherein the light is spaced from the web camera.

13. The computer display of claim 10, wherein the diffusion element comprises a light pipe containing a material that diffuses rays of light that pass through the light pipe.

14. A notebook computer comprising:
a base;
a display that is connected to the base, the display comprising a display screen that is surrounded by an outer housing, the outer housing including an integrated web camera and an integrated light adapted to illuminate a subject when images are captured with the web camera; and
a processing device and memory, the memory storing an illumination control program configured to control operation of the integrated light by presenting a graphical user interface on the display facilitating manual control of the integrated light.

15. The notebook computer of claim 14, further comprising a light sensor adapted to sense ambient light conditions.

16. The notebook computer of claim 15, wherein the light sensor is integrated into the outer housing of the display, wherein the illumination control program is configured to control operation of the integrated light relative to information sensed by the light sensor.

17. The notebook computer of claim 16, wherein the intensity of the light emitted by the integrated light is controlled relative to the ambient light conditions sensed by the light sensor.

18. The notebook computer of claim 14, wherein the outer housing of the display comprises multiple integrated lights.

19. The notebook computer of claim 18, wherein the integrated lights are positioned on lateral sides of the outer housing of the display.

* * * * *